United States Patent
Beiler

(10) Patent No.: US 6,817,677 B1
(45) Date of Patent: Nov. 16, 2004

(54) WASTE MATERIAL COLLECTION TRAILER

(76) Inventor: Aaron J. Beiler, 5472 Mountain View Dr., Gap, PA (US) 17527

( * ) Notice: Subject to any disclaimer, the term of this patent is extended or adjusted under 35 U.S.C. 154(b) by 74 days.

(21) Appl. No.: 10/622,629

(22) Filed: Jul. 18, 2003

(51) Int. Cl.$^7$ .............................. B60P 1/34; B60P 1/16
(52) U.S. Cl. ................. 298/22 C; 228/22 R; 228/21 R
(58) Field of Search ............................. 298/17 R, 17.5, 298/17 S, 19 R, 21 R, 22 P, 22 R, 22 C

(56) References Cited

U.S. PATENT DOCUMENTS

| | | | | |
|---|---|---|---|---|
| 172,454 A | * | 1/1876 | Kramer | 298/17 R |
| 175,385 A | * | 3/1876 | Steward | 298/19 R |
| 545,264 A | * | 8/1895 | Booth et al. | 298/17 R |
| 1,390,122 A | * | 9/1921 | Gilbert et al. | 298/19 R |
| 1,497,489 A | * | 6/1924 | Cochran | 298/17.5 |
| 1,546,261 A | * | 7/1925 | Spencer | 298/22 R |
| 1,942,319 A | * | 1/1934 | Wright | 298/11 |
| 2,178,841 A | * | 11/1939 | Lubbers | 180/14.4 |
| 2,332,326 A | * | 10/1943 | Lex | 280/63 |
| 2,345,159 A | * | 3/1944 | Schroter et al. | 298/18 |
| 2,391,948 A | * | 1/1946 | Couse | 280/676 |
| 2,427,132 A | * | 9/1947 | Godbey | 180/337 |
| 2,436,017 A | * | 2/1948 | Powers | 298/22 P |
| 3,019,054 A | * | 1/1962 | Stahly | 298/18 |
| 3,092,273 A | * | 6/1963 | Schramm | 414/473 |
| 3,619,007 A | * | 11/1971 | Phillips | 414/471 |
| 3,902,616 A | | 9/1975 | Santic et al. | 214/313 |
| 4,568,028 A | * | 2/1986 | Verseef et al. | 239/657 |
| 4,951,999 A | | 8/1990 | Rudolph et al. | 298/11 |
| 5,000,645 A | | 3/1991 | Polojarvi | 414/471 |
| 5,580,134 A | | 12/1996 | Allwine | 298/11 |
| 6,217,122 B1 | * | 4/2001 | Kirbie | 298/17.5 |
| 6,238,166 B1 | * | 5/2001 | Collier | 414/436 |
| 6,254,192 B1 | * | 7/2001 | Spreitzer | 298/22 R |
| 6,309,164 B1 | | 10/2001 | Holder et al. | 414/399 |
| 6,547,509 B1 | | 4/2003 | Edmo | 414/639 |

FOREIGN PATENT DOCUMENTS

GB            2104487       *  3/1983

* cited by examiner

Primary Examiner—D. Glenn Dayoan
Assistant Examiner—H. Gutman
(74) Attorney, Agent, or Firm—Martin Fruitman

(57) ABSTRACT

The apparatus is a self propelled trailer with a bin with closed sides and a tailgate for collecting waste material directly as it is stripped from a building and dumping the material into a nearby vehicle. The entire bin can be moved out beyond the rear of the trailer and raised to the level as high as the eaves of a roof by the use of hydraulic pistons. The trailer can be moved under its own power to a dump truck, and, with the bin raised, the tailgate is opened and the bin is tilted rearward to dump its load over the side of a truck. Large hinged extension flaps at the top of the sides are held at an angle sloping into the bin to approximately double the "catch" area of the bin and prevent material from failing to the ground.

6 Claims, 4 Drawing Sheets

WASTE MATERIAL COLLECTION TRAILER

BACKGROUND OF THE INVENTION

This invention deals generally with dumping vehicles and more specifically with a self propelled trailer that has lifting, dumping, and rear extension features.

Stripping old material from a building roof in order to put on a new roof is a time consuming and dirty job. It sometimes involves throwing the old material to the ground around the building and then manually picking it up to put it into a disposal container. Even if the material can be thrown directly into a container there remains the problem of getting the container or the material onto a vehicle to move it off the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window However, it is not always possible to move a large truck into a location adjacent to a building. Fences, lawns, and shrubs can easily be damaged by any size truck, and it is even more likely when dealing with the typical large dump truck.

It would be very beneficial to have a vehicle that could move around the typical landscaped yard surrounding a building and could place a collection container in a location to collect discarded material without damaging the lawn and plants. Substantially greater benefit would be derived from such a vehicle if it could also unload the collection container into a standard dump truck parked on or near the work site.

SUMMARY OF THE INVENTION

The present invention is a road-legal trailer for collecting discarded construction material directly as it is stripped from a building and for dumping the material into a nearby larger vehicle. The trailer is self propelled by an on board small power source so that it can move within a job site to areas inaccessible to larger vehicles.

The basic structure of the invention is a bin with closed sides and a tailgate, and the bin is mounted on two main beams that pivot at the front of the trailer chassis, so that the bin can be raised as high as the eaves of a roof by a first set of lifting hydraulic pistons raising the rear end of the main beams upward. The main beams can also be extended out beyond the rear of the trailer by an extension hydraulic piston that moves sleeve-like beam extensions of the main beams rearward. A pair of support beams pivoting from the beam extensions can be raised by a second set of lifting hydraulic pistons so that the front of the support beams can be raised and the bin leveled.

This permits the convenient collection of discarded construction material with a container that can be placed high and immediately adjacent to the exterior sides of a building. For roof work, it means that the container can be placed just below the roof edge and under the roof overhang, and material can be thrown directly from the roof into the bin while protecting flower beds or bushes that are up against the building wall.

When the bin requires emptying, it is moved under its own power to a dump truck. Then, without lowering the entire bin, the tailgate is opened, and the bin is tilted rearward to dump its load over the high side of a truck. This tilting is accomplished simply by extending the second set of lifting hydraulic pistons even more to raise the front of the bin.

Both sides of the bin have flap-like extension panels attached to their top edges. These extension panels are opened outward and supported at an angle sloping into the bin by angularly extending chains. When opened at the work site, these extension panels approximately double the catch area of the bin and prevent stray material from falling to the ground.

Hydraulic jacks located at the corners of the trailer chassis stabilize the apparatus when it is collecting material, and particularly when the bin is extended rearward.

The trailer of the present invention thereby makes it possible to collect material from a window, door, or the roof of a building without disturbing the landscaping. In fact, the narrow width of the preferred embodiment of the invention even makes it possible to move the vehicle through a typical gate in a residential fence. Furthermore, it permits dumping the collected material directly from the collection bin into a truck of virtually any size.

DETAILED DESCRIPTION OF THE INVENTION

Figure 1:
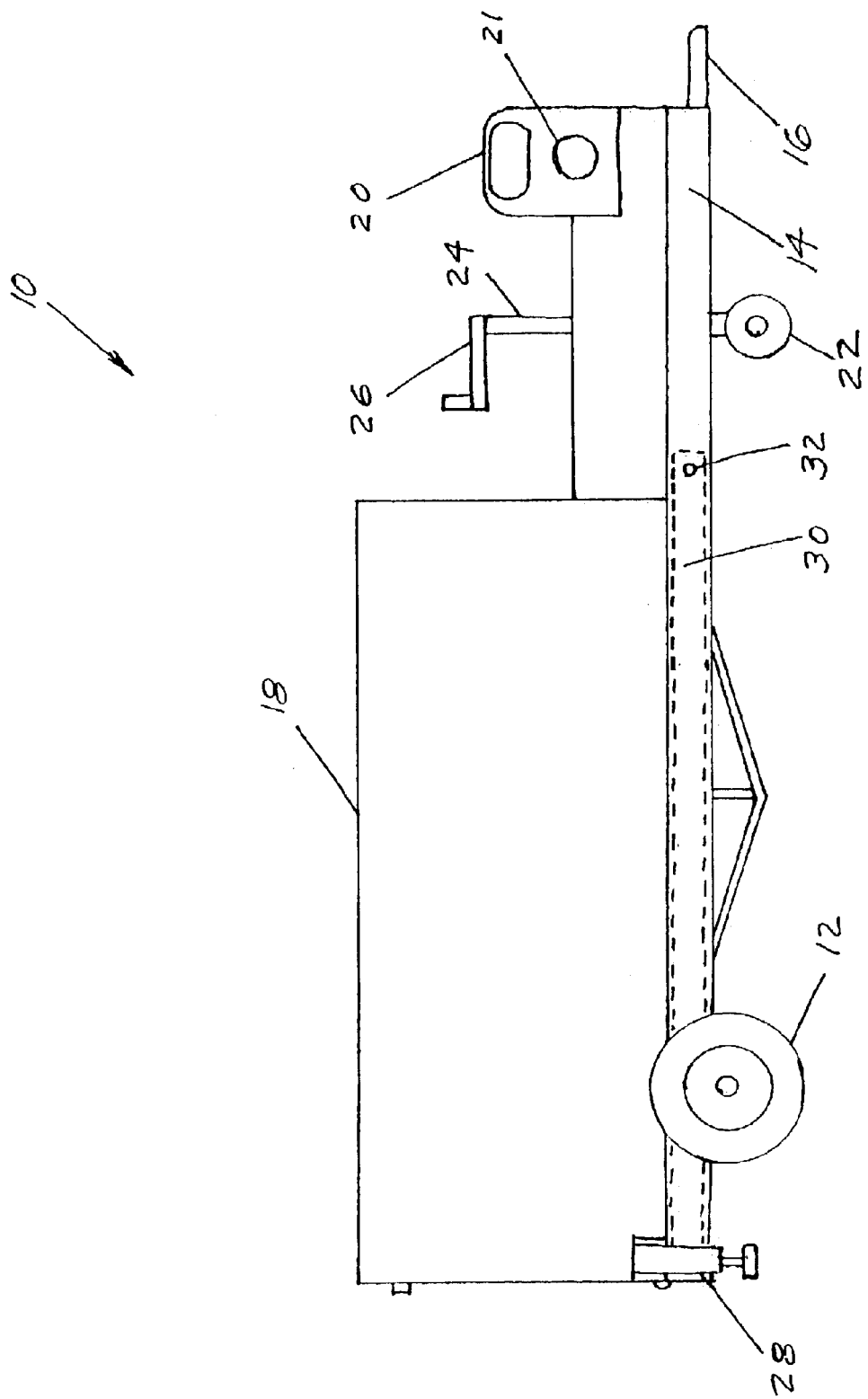
FIG. 1 is a schematic side view of the trailer of the preferred embodiment of the invention as it appears when it is ready for towing on roads.

FIG. 1 is a schematic side view of trailer 10 of the preferred embodiment of the invention as it appears when it is ready for towing on roads. As with any conventional road ready trailer, trailer 10 includes rear road wheels 12, one of which is on the opposite side of trailer 10 chassis beams 14, one of which is on the opposite side of trailer 10, and hitch coupler 16.

To accomplish the functions of the invention, trailer 10 also includes bin 18 mounted toward the rear of chassis beams 14, which is used for collection of material and power source 20, which is attached to adjacent conventional hydraulic pump 21 for powering the hydraulic pistons aboard the trailer. Power source 20 can be a small internal combustion engine, a battery powered motor, or even an electric motor operating on line voltage. Power source 20 is interconnected with rear road wheels 12 by conventional means such as chains, belts, or a drive shaft and a transmission so that trailer 10 can be moved around a work site under its own power. Rear wheels 12 can also be powered by a hydraulic motor installed adjacent to the wheels and interconnected to the on board hydraulic pump by hydraulic lines. Regardless of the specific mode of powering rear wheels 12 power source 20 includes conventional controls for starting, stopping, and regulating its speed.

Trailer 10 also includes steerable front wheels 22 for maneuvering the trailer when it is being self propelled. In the preferred embodiment front wheels 22 are a pair of small wheels mounted together on a common axle and steered by direct connection to shaft 24 that is manually turned by lever 26. However, it is a simple matter to include a gear set to reduce the turning effort.

The combination of on board power for rear wheels 12 and steerable front wheels 22 makes it possible to effortlessly move trailer 10 around a work site even when bin 18 is fully loaded.

Trailer 10 also includes conventional hydraulically extendible stabilizer pistons 28 located near at least the rear corners of the trailer. These pistons are extended to ground level to stabilize trailer 10 before bin 18 is raised to receive material.

Figure 2:
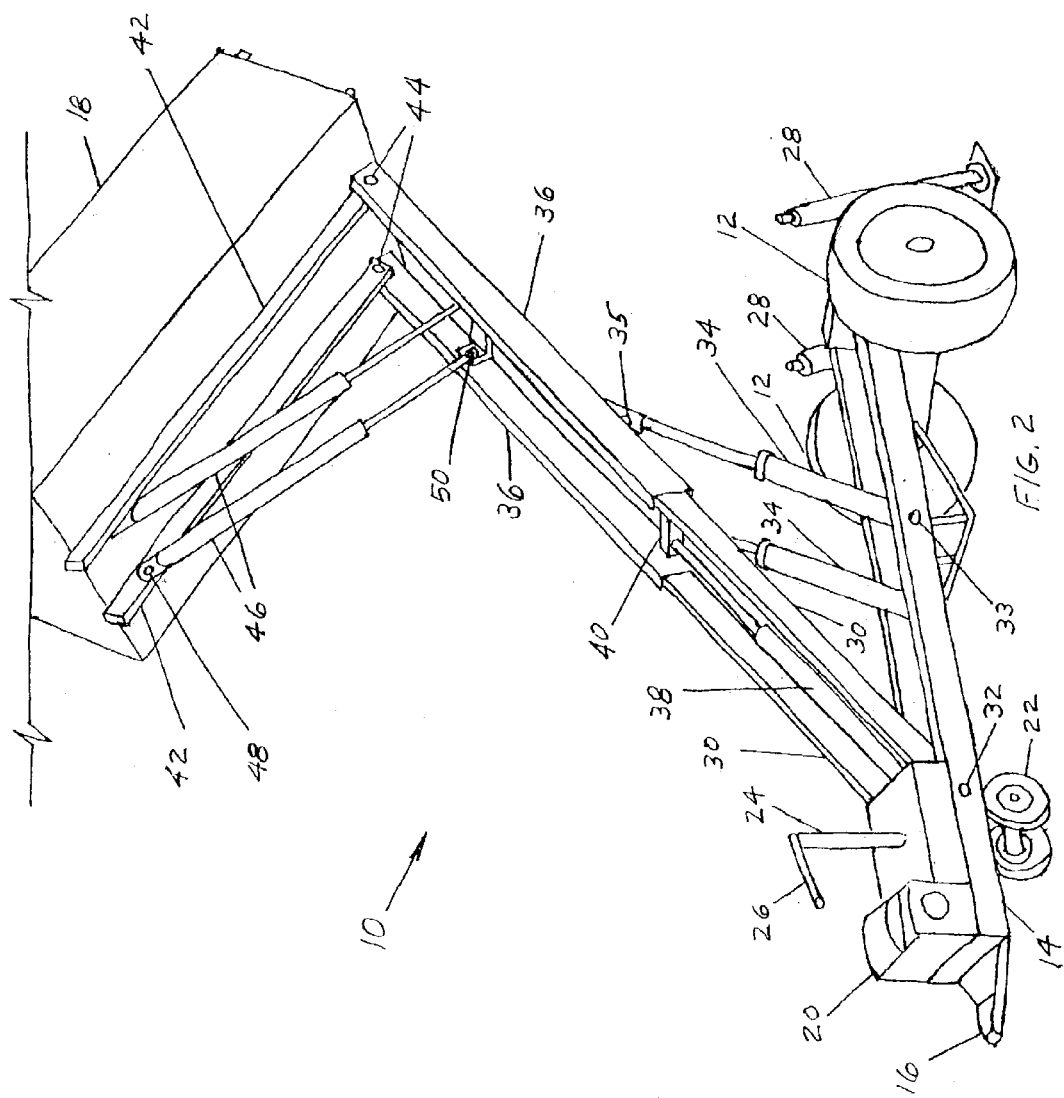
FIG. 2 is a perspective view of the trailer of the preferred embodiment of the invention as it appears when it is it is fully raised and extended for dumping.
Figure 3:
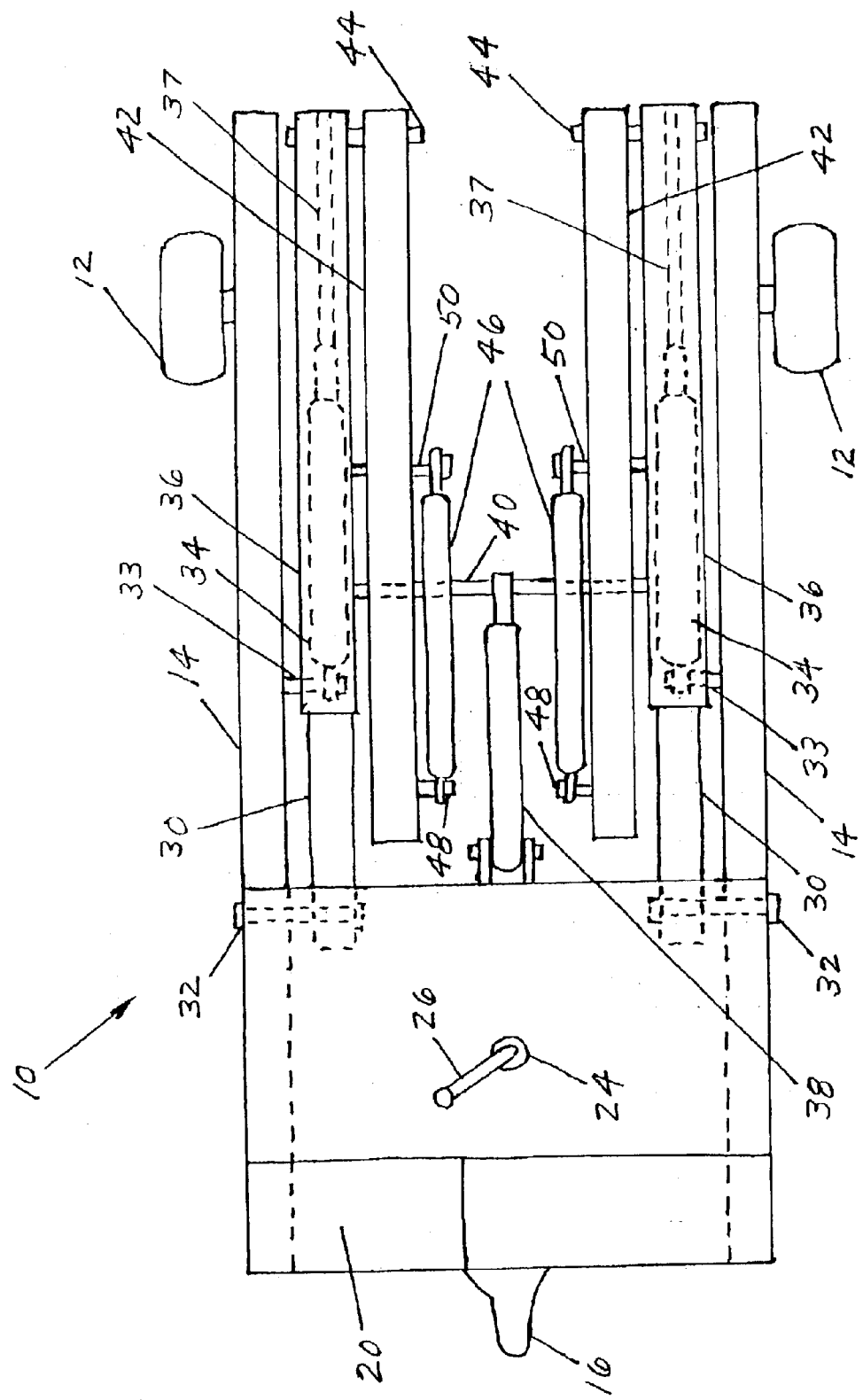
FIG. 3 is a schematic top view of the trailer of the preferred embodiment of the invention with the bin removed to show the relationship of the various support beams and the locations of the several hydraulic pistons when the trailer is road ready.

Some of the apparatus to lift and move bin 18 can also be seen in FIG. 1, and these parts can also be seen in FIG. 2 and FIG. 3, the descriptions of which further explain their locations and functions. Main beams 30 (a second one is on the far side of trailer 10) support bin 18 and another set of support beams that are attached directly to the bottom of bin 18. Main beams 30 pivot upward around pivot points 32 that are attached to chassis beams 14 near the front edge of bin 18. The upward pivoting of main beams 30 is powered by hydraulic pistons that are shown in FIGS. 2 and 3.

FIG. 2 is a perspective view of trailer 10 of the preferred embodiment of the invention as it appears when it is it is fully raised, extended, and tilted for dumping. The complete lifting procedure is accomplished by two pivoting actions. The first action is that the rear ends of main beams 30 pivot upward on pivot points 32 that are attached to chassis beams 14 near the front of trailer 10. The pivoting of main beams 30 is powered by hydraulic pistons 34, with one end of each also attached to chassis beams 14 at pivot points 33, and the other end attached to the bottom surface of main beam 30 at pivot point 35. That particular attachment location permits main beams 30 to include sliding extensions 36.

In the preferred embodiment, sliding extensions 36 are constructed as sleeves around main beams 30 with slots 37 (see FIG. 3) in the bottom of sleeves 36. This permits hydraulic pistons 34 to be attached to main beams 30 through slots 37 at a location much further from pivot point 32 than if slotted sleeves were not used. Extensions 36 are moved along main beams 30 by hydraulic piston 38 that is attached to cross tie 40 which is attached to both extensions 36. Although it is sometimes desirable to move extensions 36 straight back while main beams 30 remain horizontal, the movement of extensions 36 rearward is particularly useful when main beams 30 have been pivoted upward.

The ends of extensions 36 are attached to bin support beams 42 upon which bin 18 is mounted. Support beams 42 are attached to and pivot relative to extensions 36 with their pivot points 44 located at the rear ends of both extensions 36 and bin support beams 42. Thus, when the front end of bin 18 is pivoted upward and away from extensions 36, bin 18 takes on an orientation that permits the dumping of the material within bin 18 out the rear of bin 18. The front of bin 18 is pivoted upward by hydraulic pistons 46 that are attached between pivot points 48 near the front end of support beams 42 and pivot points 50 at a location approaching the rear of extensions 36. The extension of hydraulic pistons 46 can be controlled to dump bin 18 both when it is lifted to its maximum height and also when resting on trailer 10. Furthermore, when bin 18 is raised to collect material, hydraulic pistons 46 can also be used to level bin 18 or to tilt it toward the front of trailer 10 to better distribute its load.

FIG. 3 is a schematic top view of trailer 10 with bin 18 removed to show the beam layout of the preferred embodiment and the relationship of the various support beams and the locations of the several hydraulic pistons when trailer 10 is prepared for road travel.

When fully lowered as shown in FIG. 3 all the beams and the hydraulic pistons that operate them are located approximately within the plane of chassis beams 14. Thus, main beams 30 are located adjacent and parallel to chassis beams 14, and hydraulic pistons 34 that lift main beams 30, are mounted just below main beams 14. Extensions 36 with slots 37 are shown fully retracted onto main beams 30, and hydraulic piston 38, which moves them rearward along main beams 30, is located in the center of trailer 10. Piston 38 is connected to extensions 36 by cross tie 40.

Support beams 42 are positioned adjacent and parallel to main beams 30 and are located between main beams 30 and centrally located hydraulic piston 38. Hydraulic pistons 46 that lift support beams 42 are located adjacent to and inboard of their respective beams. The various pivot points for the beams and hydraulic pistons that have been previously described in regard to FIG. 2 are also shown in FIG. 3 when the beams are in their lowered positions.

Figure 4:
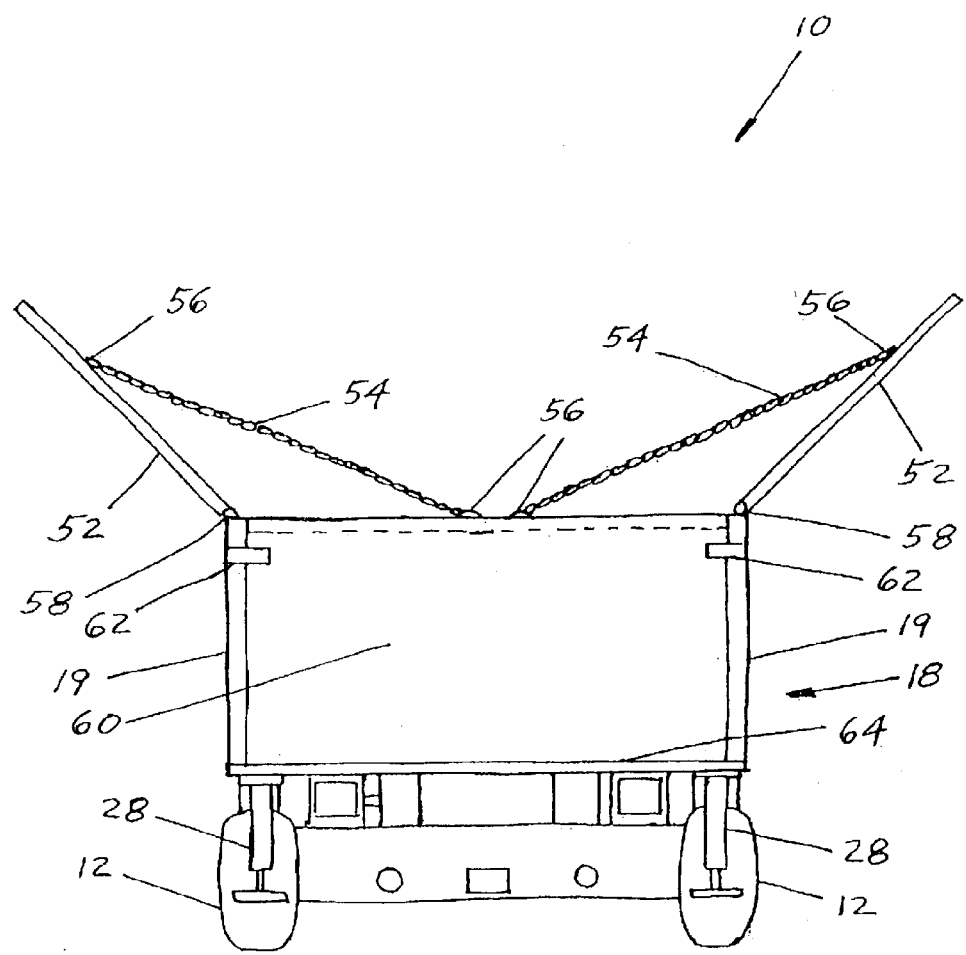
FIG. 4 is a schematic rear view of the trailer of the preferred embodiment of the invention showing the extension panels opened outward and supported at an angle sloping into the bin by angularly extending chains.

FIG. 4 is a schematic rear view of trailer 10 of the preferred embodiment of the invention showing extension panels 52 opened outward and supported at an angle sloping into bin 18 by angularly extending chains 54. When opened at the work site, extension panels 52 approximately double the "catch" area of bin 18 and prevent stray material from falling to the ground. Chains 54 are conventionally anchored to bin 10 and extension panels 52 at anchors 56, and extension panels 52 are conventionally mounted on the top edges of sides 19 of bin 18 with hinges 58.

Tailgate 60 of bin 18 is opened to dump material out of bin 15. To accomplish this, latches 62 are opened, and tailgate 60 is opened and rotated downward on hinge 64.

The preferred embodiment of trailer 10 has the following specifications:

overall length with extensions retracted—12 ft. 6 in.
overall length with extensions fully deployed—17 ft. 6 in.
maximum width—5 ft. 10 in.
bin dimensions—8 ft. 2 in. long, 5 ft. 10 in. wide
bin width with extension panels deployed—11 ft. 10 in.
road height—5 ft. 10 in.
maximum level bin floor height when lifted—10 ft.
maximum rear dump angle of fully lifted bin—45 degrees
power source rating—13 horsepower The described structure of the preferred embodiment of trailer 10 thereby furnishes a very versatile vehicle that is both towable and self propelled. It can therefore approach closer to most buildings and provide convenient accumulation of construction waste material while also facilitating moving and dumping such material into larger vehicles for final disposal.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other positions may be used for the various beams and hydraulic cylinders when they are stowed for the trailer's road travel, and other means can be used to support the extension panels when they are deployed. Furthermore, any convention power system of self propulsion can be used on the trailer, and additional or fewer hydraulic pistons can be used for each particular application described for the pistons.

What is claimed as new and for which Letters Patent of the United States are desired to be secured is:

1. A trailer for collecting and dumping material comprising:

a towable chassis with a hitch coupler at a first end of the chassis and at least two road wheels located adjacent to a second end of the chassis that is remote from the hitch coupler;

at least one steerable wheel located adjacent to the first end of the chassis with a steering control mechanism interconnected with the steerable wheel;

a power source mounted upon the chassis and interconnected with the road wheels to power the road wheels;

a hydraulic system mounted upon the chassis and including a hydraulic pump interconnected with and powered by the power source;

at least two pivoting main beams, each attached to the chassis at a pivot point located at a point on the chassis adjacent to the first end of the chassis with the main beams extending to a location adjacent to the second end of the chassis;

at least one hydraulic piston powered by the hydraulic pump and interconnected with the pivoting main beams and the chassis to lift the ends of the main beams that are adjacent to the second end of the chassis above the chassis;

at least two pivoting support beams each attached to one said main beam at a pivot point located at a point on the respective main beam adjacent to the second end of the chassis, with the support beams extending toward the first end of the chassis;

at least one hydraulic piston powered by the hydraulic pump and interconnected with the pivoting support beams and the main beams to lift the ends of the support beams that extend toward the first end of the chassis above the main beams;

a bin attached to and supported by the support beams.

2. The trailer of claim 1 further including movable extensions on the main beams, with the extensions having ends movable out beyond the second end of the chassis, with the pivot points of the support beams attached to the extensions adjacent to the ends of the extensions that extend out beyond the second end of the chassis, and the hydraulic pistons that are interconnected with the support beams also interconnected with the extensions of the main beams.

3. The trailer of claim 2 further including at least one hydraulic piston interconnected with the chassis and the extensions of the main beams to power the movement of the extensions.

4. The trailer of claim 1 wherein the bin includes a tailgate that can be opened.

5. The trailer of claim 1 further including at least two hydraulic stabilizer pistons, one located adjacent to each of the corners at the second end of the chassis.

6. The trailer of claim 1 wherein the chassis includes at least two chassis beams extending from the first end of the chassis to the second end of the chassis.

* * * * *